United States Patent Office 3,426,008
Patented Feb. 4, 1969

3,426,008
WATER-SOLUBLE MONOAZO DYESTUFFS AND THEIR METAL COMPLEX COMPOUNDS
Fritz Meininger and Ernst Hoyer, Frankfurt am Main, Germany, assignors to Farbwerke Hoechst Aktiengesellschaft vormals Meister Lucius & Bruning, Frankfurt am Main, Germany, a corporation of Germany
No Drawing. Filed Aug. 3, 1965, Ser. No. 477,000
Claims priority, application Germany, Aug. 6, 1964,
F 43,675
U.S. Cl. 260—151       8 Claims
Int. Cl. C09b 45/16, 45/18, 45/20

ABSTRACT OF THE DISCLOSURE

Water-soluble monoazo-dyestuffs and their complex copper, chromium and cobalt compounds containing at least one or both groups of the formulae $$-X-N(R_3)-SO_2-CH_2-CH_2-S-SO_3M$$

and $$-Y-N(R_3)-SO_2-CH_2-CH_2-S-SO_3M$$

wherein X is a direct linkage,

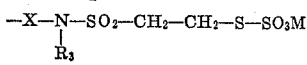, 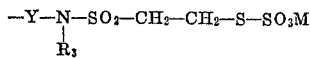

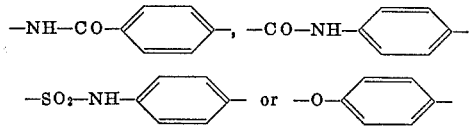

Y is a direct linkage or

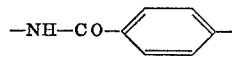

$R_3$ is a lower alkyl, lower alkylene—COO—lower alkyl or lower alkylenecyano, and M is a hydrogen, alkali metal or calcium atom, which dyestuffs are suitable for dyeing or printing silk, wool, leather, synthetic polyamides and polyurethanes, and regenerated and natural protein and cellulose materials such as cotton, linen and viscose rayon.

---

The present invention provides new valuable water-soluble monoazo dyestuffs and their complex metal compounds and a process for preparing them; it provides in particular water-soluble monoazo dyestuffs of the general Formula 1

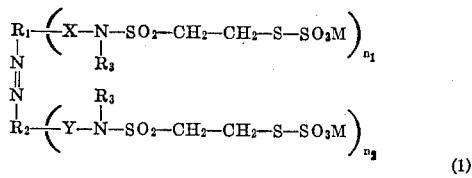
(1)

wherein M represents a hydrogen, alkali metal or calcium atom, $R_1$ represents a benzene radical which may be substituted by halogen atoms, hydroxy, low molecular alkyl, low molecular alkoxy, nitro or —$SO_3M$ groups, or a naphthalene radical, which contains at least one sulfonic acid group, $R_2$ stands for (a) a benzene radical which is substituted by a low molecular alkyl or low molecular alkoxy groups, (b) a naphthol radical which is substituted by acetylamino, benzoylamino, phenysulfonylamino or $MO_3S$ groups, or (c) the radical of the 1-phenyl-5-pyrazolone which is substituted in the 3-position of the pyrazolone nucleus by a methyl, carboxyl or —COO—low molecular alkyl and may be sustituted in the phenyl radical by a halogen atom, a low molecular alkyl group or the group —$SO_3M$, $R_3$ is a lower alkyl, lower alkenyl—COO—lower alkyl or lower alkyl-cyano group, X represents a direct linkage or the groups

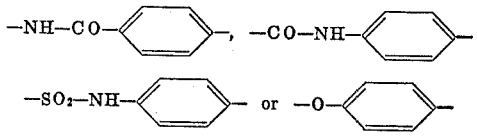

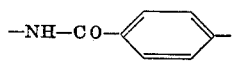

Y represents a direct linkage or the group

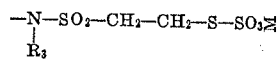

$n_1$ and $n_2$ stand for 0 to 1, the sum of $n_1$ and $n_2$ being at least 1, and their complex metal compounds, in particular their nickel, coper, chromium and cobalt complex compounds.

We have found that new valuable water-soluble monoazo dyestuffs of the general Formula 1 mentioned above may be prepared by (a) Combining aromatic diazo and coupling components, at least one of these components caintaining at least tion into the group of the formula $$-N(R_3)-SO_2-CH_2-CH_2-S-SO_3M$$

in which $R_3$ and M have the meanings given above, and by converting the finished azo dyestuff, provided it contains metal complex forming groups or groups able to be converted into such groups, into the complex metal compound, if desired, according to known methods, or by (b) Reacting monoazo dyestuffs of the general formula

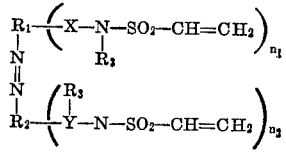

in which $R_1$, $R_2$, $R_3$, X, Y, $n_1$ and $n_2$ have the meanings given above, or, if desired, the complex metal compounds thereof, with salts of thiosulfuric acid and maintaining the pH- value within a range of 3 and 8 by addition of an inorganic or organic acid, the vinylsulfonyl amino group being converted during a quick and complete reaction into the group of the formula

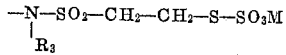

in which $R_3$ and M have the meanings mentioned above, or by converting the monoazo dyestuff capable of forming a metal complex—provided it is used in its metal-free form—if desired, after the reaction into its complex metal compound.

The azo dyestuffs of the present invention may contain, in addition to groups imparting solubility which correspond to the formula

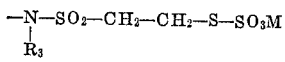

in which $R_3$ and M have the meanings given above, other groups imparting solubility in water, preferably sulfonic acid groups. The number of the sulfonic acid groups which may be present in the molecule influences the utility of the dyestuffs for their various fields of application.

In case the new azo dyestuffs contain in the o-position to the azo group substituents which are capable of forming metal complexes or a substituent convertible into a metal complex forming group, they may be converted in substance or on a substratum into their complex metal compounds, preferably into the copper, cobalt or chromium complex compounds.

To prepare the dyestuffs according to the method described (sub *a*), diazotised aromatic amines containing at least once the substituent of the formula

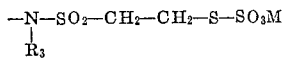

are coupled with any coupling component, or coupling components which contain said substituent at least once, or are coupled with any diazotised aromatic amine the diazo component, of which also may contain one of said substituents. The coupling reaction is effected under the usual conditions for azo dyestuffs in an acid, neutral or weakly alkaline medium.

Appropriate diazo components are, for example, primary amines of the benzene or naphthalene series. Suitable coupling components are, for example, aminobenzenes, hydroxynaphthalenes, aminonaphthalenes, heterocyclic coupling components, such as pyrazolone derivatives.

These components may be prepared by reacting the corresponding starting compounds which contain at least once the grouping of the formula

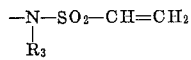

with salts of thiosulfuric acid in an aqueous medium under the conditions given below for pre-manufactured dyestuffs.

As starting dyestuffs, that can be converted into coupling or diazo components to be used according to the process of the present invention by reaction with salts of thiosulfuric acid, there may be mentioned, for example:

(a) Diazo components: the reaction products of salts of thiosulfuric acid with 4-(N-methyl-vinylsulfonyl-amino)-1-amino-benzene, 3-(N-methyl-vinylsulfonylamino)-1-aminobenzene, 3 - (N-methyl-vinylsulfonylamino)-4-methoxy-1-aminobenzene, 4 - (N-butyl-vinylsulfonylamino-1-aminobenzene, 4 - (N-ethyl-vinylsulfonylamino)-2-amino-1-hydroxybenzene, 4-(N-methyl-vinylsulfonylamino)-2,5-dimethoxy-1-aminobenzene, 3 - (N-β-cyanethylvinylsulfonylamino)-1-aminobenzene, 4-(N-β-cyanethylvinylsulfonylamino)-1-aminobenzene, 3-(N-β-carboxyethylvinylsulfonylamino)-1-aminobenzene, 4-(N-carbethoxyethylvinylsulfonylamino)-1-aminobenzene, 4-(N-β-cyanethylvinylsulfonylamino)-6-amino - 1,3 - dimethylbenzene, and compounds of the general formula

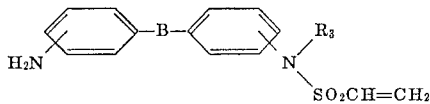

in which R₃ has the meaning given above, B represents a bridge member, for example the group —CO—NH—, —SO₂—NH— or —O—, the aromatic nuclei may carry other substituents of azo dyestuffs such as halogen atoms, alkyl, alkoxy, hydroxyl, nitro or sulfonic acid groups. There may also be used the reaction products of salts of the thiosulfuric acid with compounds, that are obtained by reaction of one mol of the compound of the following formula

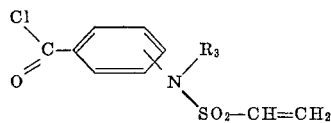

with, for example, one mol of 1,3- or 1,4-diaminobenzene, 1,3-diaminobenzene-4-sulfonic acid or 1,4-diaminobenzene-3-sulfonic acid.

(b) Coupling components: the reaction products of salts of thiosulfuric acid with 2-(N-methyl-vinylsulfonylamino)-5-hydroxynaphthalene - 7 - sulfonic acid, 3-(N-methyl-vinylsulfonylamino) - 5 - hydroxynaphthalene-7-sulfonic acid, 8 - vinylsulfonylamino-1-hydroxynaphtha- lene-3,6- or 4,6-disulfonic acid, 1-(N-methyl-vinylsulfonyl-amino) - 5 - hydroxynaphthalene - 7 - sulfonic acid, pyrazolones, such as 1-(4'-N-methyl-vinylsulfonylaminophenyl)-3-methyl-5-pyrazolone, compounds of the general formula

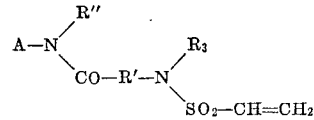

in which R₃ has the meaning given above, R″ represents a hydrogen atom or a low molecular alkyl group, R′ stands for a phenyl radical, which may contain other substituents, A represents an aryl radical capable of coupling, for example, a substituted phenyl, or α or β-naphthyl radical. The aryl group A capable of coupling may contain in addition to hydroxy and/or amino groups other substituents, in particular sulfonic acid groups which, after the reaction, are in the o-position to the azo group.

The azo dyestuffs and the complex metal compounds thereof obtained according to the present invention are prepared as described (sub *b*) by reacting the starting dyestuffs containing at least one group of the formula

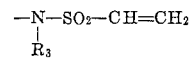

in an aqueous or aqueous organic solution or suspension with salts of thiosulfuric acid at a pH-value ranging from approximately 3 to 8 and at temperatures within a range of from approximately 15 to 120° C., preferably from approximately 40 to 100° C. The hydrogen ions used up during the reaction are replaced by addition of an inorganic acid, such as carbonic acid, hydrochloric acid, sulfuric acid or phosphoric acid, or an organic acid, such as formic acid and acetic acid.

As organic solvents, which in admixture with water may be used as reaction medium, there are mentioned, for example, methanol, ethanol, acetone and dimethylsulfoxide.

To understand method (b) there follows a description of a number of various appropriate starting dyestuffs which, however, do not limit the present invention.

(1) Monoazo dyestuffs of the general formula

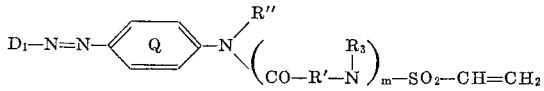

wherein D₁ represents the radical of a coupling component of the naphthalene series, *m* stands for 0 or 1, R″ represents a hydrogen atom or a low molecular alkyl radical which has the meaning of R₃ if *m* is 0, R₃ has the meaning given above, R′ is a benzene ring and R′ and the benzene ring Q may carry other substituents.

(2) Monoazo dyestuffs of the general formula

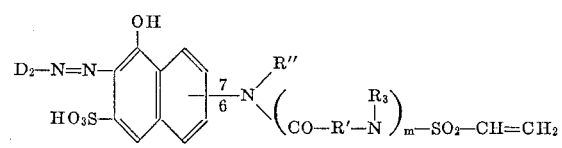

wherein the group

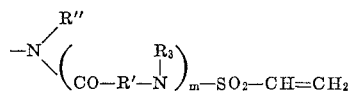

is linked to one of the two carbon atoms (6) or (7), D₂ represents a mono- or bicyclic aryl radical, for example a benzene or napththalene radical. The radical D₂ may contain other substituents, for example, halogen atoms, alkyl groups, such as methyl groups, or acylamino groups and alkoxy groups, and particularly sulfonic acid groups. R′, R″ and *m* have the meanings given in (1).

(3) Monoazo dyestuffs of the general formula

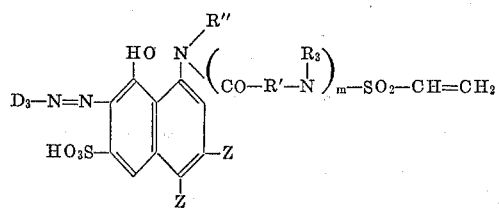

wherein one Z represents a hydrogen atom, the other Z stands for a sulfonic acid group, $D_3$ represents a mono- or bicyclic radical of a diazo component, which may contain preferably sulfonic acid groups. The meanings of $R'$, $R''$, $R_3$ and $m$ are the same as in (1).

(4) Monoazo dyestuffs of the general formula

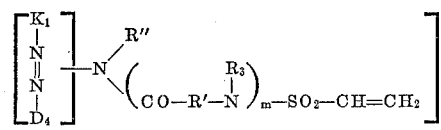

wherein $R'$, $R''$, $R_3$ and $m$ have the above meanings, $D_4$ represents a radical of the benzene or naphthalene series and $K_1$ represents the radical of a coupling component of the benzene, naphthalene or pyrazolone series, and wherein the side group may be linked to $K_1$ or $D_4$.

(5) Monoazo dyestuffs of the general formula

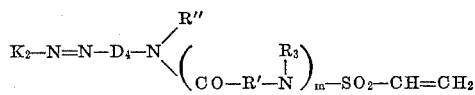

wherein $'$, $R''$, $R_3$, $D_4$ and $m$ have the meanings given above, and $K_2$ represents the radical of a coupling component of the naphthol series.

(6) Complex metal compounds, particularly copper, nickel, cobalt and chromium complex compounds, of monoazo dyestuffs which contain in the molecule metallisable groupings such as o,o'-dihydroxyazo, o-alkoxy-o'-hydroxyazo or o-carboxy-o'-hydroxyazo groupings and at least once the group of the formula

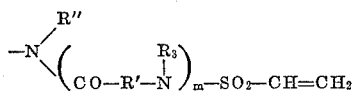

As starting compounds there may be used for the present process 2:1 or 1:1 complex metal compounds. The dyestuffs obtained according to the process of the present invention may contain, in addition to groups imparting solubility in water, other substituents known for azo dyestuffs, such as alkyl, sulfone, acylamino, nitro, hydroxy and alkoxy groups and halogen atoms.

The new dyestuffs are suitable for dyeing and printing material of various kinds, for example, silk, wool, leather, synthetic polyamides and polyurethanes, regenerated and natural protein and cellulose materials, such as cotton, linen and viscose rayon. The new dyestuffs are applied in accordance with the usual dyeing and printing processes known in the art, in the presence of acid binding agents. By dyeing as usual in weakly acid, neutral or weakly alkaline dyestuff solutions the dyestuffs may also be applied to wool, silk, regenerated protein, polyamide and modified polyacrylonitrile textiles. The pH-value may be changed during the dyeing process by appropriate additions, for example by starting the dyeing process at a pH-value of 4 and by increasing during the operation the pH to 7.5.

The dyestuffs may be applied according to known printing processes to silk, wool, and textiles of regenerated protein fibers.

The dyeings obtained with the water-soluble dyestuffs described above on cellulose fibers are distinguished by the purity of their shades and an intense depth of color. By a simultaneous treatment with an acid binding agent there are obtained on cellulose textiles strong shades of good to very good fastness to washing and light. Owing to their better solubility, improved resistance to alkalis and their reduced sensitivity to electrolytes, the dyestuffs obtained according to the process of the present invention are superior to the dyestuffs known from Belgian Patent No. 606,461. The following examples serve to illustrate the invention but they are not intended to limit it thereto, the parts being by weight unless otherwise stated and the relationship of parts by weight to parts by volume being that of the kilogram to the litre.

Example 1

106 parts of 4-(N-methyl-vinylsulfonylamino)-1-amino benzene are suspended in 1000 parts by volume of water and mixed with 125 parts of crystallised sodium thiosulfate. The mixture is heated to 70°–75° C. and maintained at that temperature for about 5 hours at a pH-value of 5.7 to 6.2, by adding dropwise acetic acid of 50%. After cooling the solution obtained is mixed with 2 parts of animal charcoal and 10 parts of Kieselguhr, stirred for 15 minutes and filtered. The filtrate is saturated with potassium chloride, upon which the product precipitates. After filtering and dissolving the residue in 375 parts by volume of water and solution obtained is mixed with 63 parts by volume of concentrated hydrochloric acid while cooling. The compound which has precipitated and which corresponds to the formula

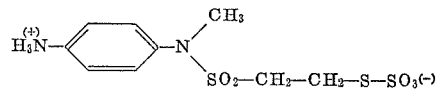

is isolated by filtration and washed first with cold water and subsequently with a small quantity of methanol. After drying at 40° C. a white crystalline powder is obtained which melts at 199° C. with decomposition.

3.26 parts of the compound thus obtained are dissolved in 20 parts by volume of water while adding 0.85 part of sodium bicarbonate and mixed with 10 parts by volume of normal sodium nitrite solution. The mixture obtained is subsequently added dropwise at 0°–5° C. to a mixture of 3 parts of concentrated hydrochloric acid and 20 parts of ice powder, and neutralised after diazotisation with 1.4 parts of sodium bicarbonate. The diazonium salt solution thus prepared is combined with a neutralised solution of 5.9 parts of 8-acetylamino-1-hydroxy-naphthalene-3.6-disulfonic acid (61.2%) in 25 parts by volume of water. On completion of the coupling the red dyestuff formed is salted out with 15% of sodium chloride (as referred to the volume of the solution), filtered and dried at 60° C. A red powder is obtained which dissolves easily in water producing a red color. The new dyestuff, which in the form of its free acid corresponds to the formula

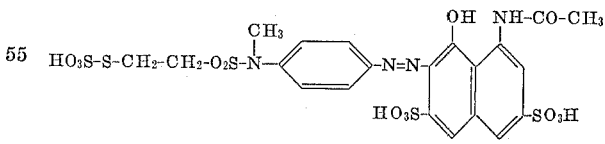

produces on cotton in the presence of sodium bicarbonate a brilliant red print of good fastness to washing and light.

Example 2

32.6 parts of 4-(N-methyl-β-thiosulfuric acid-ethyl-sulfonyl-amino)-1-aminobenzene, prepared according to the first paragraph of Example 1, are introduced into 200 parts by volume of water, neutralised with 8.5 parts of sodium bicarbonate and subsequently mixed with 20 parts by volume of 5 N sodium nitrite solution. The solution obtained is poured at 0°–5° C. into a mixture of 30 parts by volume of concentrated hydrochloric acid and 200 parts of ice powder. On completion of the diazotisation the excess of nitrous acid is destroyed with amidosulfonic acid and 14 parts of sodium bicarbonate are added until neutral. The diazonium salt solution thus obtained is then combined with a solution of 30.3 parts of 1-(2'-chloro- 5'-sulfophenyl)-3-methyl-5-pyrazolone (92.5%) and 7.35 parts of sodium carbonate in 200 parts by volume of water. After the coupling is complete the dyestuff solution is filtered, mixed with 30 parts by volume of acetic acid of 50% and then with potassium chloride of 25% (as referred to the volume of the solution). The precipitated dyestuff, which in its free acid form corresponds to the formula

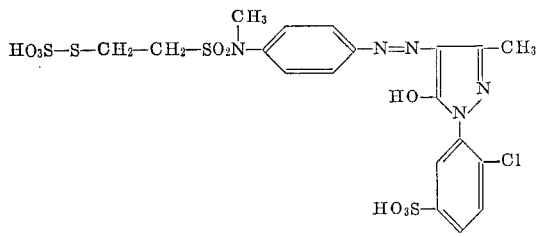

is filtered and dried. A yellow powder is obtained which dissolves in water producing a yellow color and dyes cotton in the presence of sodium hydroxide and sodium triphosphate yellow shades of very good fastness to washing and light.

Example 3

30.3 parts of a salt-containing powder which contains 85.4 percent by weight of 2-(N-methyl-ethionylamino)-5-hydroxynaphthalene-7-sulfonic acid are dissolved in 200 parts by volume of water at 5°–10° C., and while stirring thoroughly 30.5 parts of sodium hydroxide solution of 16.5% are added dropwise. The mixture is stirred for 10 minutes and neutralised in a ratio 1:1 with 10 parts by volume of hydrochloric acid. The 2-(N-methyl-vinylsulfonylamino)-5-hydroxynaphthalene-7 - sulfonic acid obtained is subsequently coupled in the usual manner with diazotised 1-aminobenzene-3-sulfonic acid. The dyestuff which has formed is isolated by salting out and filtering.

The moist filtration residue of the monoazo dyestuff obtained is introduced into 400 parts by volume of water, mixed with 18.8 parts of crystallised sodium thiosulfate and heated to 70°–75° C. at which the mixture is stirred for 3 hours and 30 minutes, the pH-value of 5.7–6.2 being maintained by adding approximately 7.5 parts by volume of acetic acid of 50%. The dyestuff solution obtained is cleared and mixed with potassium chloride. The product is filtered and dried at 60° C. in vacuo. The new dyestuff obtained corresponds in its free acid form to the formula

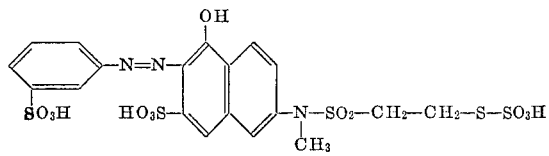

It is a water-soluble, orange powder that dyes cotton in the presence of sodium carbonate yellowish orange shades of fastness to washing and light. On wool it produces according to known dyeing and printing processes orange dyeings of very good fastness to washing and light.

Example 4

32.6 parts of 4-(N-methyl-β-thiosulfuric acid-ethylsulfonylamino)-1-aminobenzene are diazotised in the manner described in Example 2. The neutralised solution of the diazonium salt is subsequently combined with a solution of 34.1 parts of 2-acetylamino-8-hydroxynaphthalene-6-sulfonic acid in 200 parts by volume of water. The coupling mixture is stirred for 14 hours at 20° C. and neutralised with sodium bicarbonate. The dyestuff solution obtained is filtered and mixed with potassium chloride of 20% (as referred to the volume of the solution). The new dyestuff, which in its free acid form corresponds to the formula

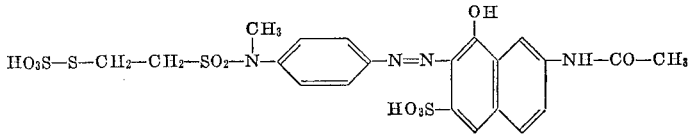

is filtered and dried. It is a red powder that produces on cellulose materials in the presence of sodium bicarbonate a strong yellowish red print of very good fastness to washing and good fastness to light.

Example 5

53 parts of 3-(N-methyl-vinylsulfonylamino)-1-aminobenzene and 62.5 parts of crystalised sodium thiosulfate are introduced into 500 parts by volume of water. While adding portion by portion 29 parts by volume of acetic acid of 50%, the mixture is stirred for 5 hours at 70°–75° C. at a pH-value of 5.7–6.2. The solution which has formed is mixed with 5 parts of animal charcoal and filtered warm. After cooling, potassium chloride of 25% (as referred to the volume of the solution) is added and the whole is stirred for 24 hours. The product, which in its free form corresponds to the formula

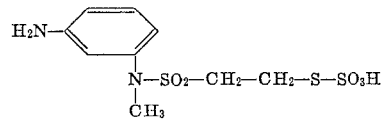

is filtered and dried at 60° C. in vacuo.

7.3 parts of the salt-containing compound thus obtained are dissolved in 40 parts by volume of water and mixed with 4 parts by volume of 5 N sodium nitrite solution. The solution is poured while stirring into a mixture of 6 parts of concentrated hydrochloric acid and 40 parts of ice powder. On completion of the diazotisation the excess of nitrous acid is destroyed with amidosulfonic acid. The solution of the diazonium salt is neutralised with sodium bicarbonate and combined with a neutralised solution of 11.8 parts of 8-acetylamino-1-hydroxynaphthalene-3.6-disulfonic acid (61.2%) in 50 parts by volume of water. On completion of the coupling the dyestuff solution is filtered and mixed with 45 parts of sodium chloride. The precipitated product, which in its free acid form corresponds to the formula

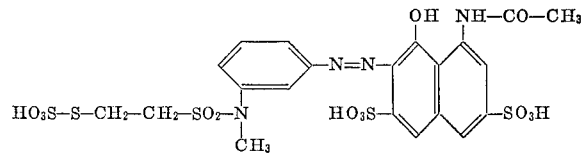

is filtered and dried. A red powder is obtained that produces on cotton in the presence of sodium carbonate red prints of fastness to washing and light.

Example 6

32.6 parts of 4-(N-methyl-β-thiosulfuric acid-ethylsulfonylamino)-1-aminobenzene are diazotised according to Example 2 and combined with a mixture of 40.5 parts of 1-naphthol-3.6-disulfonic acid (75%), 0.5 part of sodium carbonate and 200 parts by volume of water. After stirring for 2 hours the coupling mixture is neutralised with 10 parts of sodium carbonate and stirring is continued for 14 hours at 20° C. The dyestuff which has formed is salted out with sodium hydroxide solution of 20% (as referred to the volume of the solution), filtered and dried at 60° C. in vacuo.

The new dyetuff, which in its free acid form corresponds to the formula

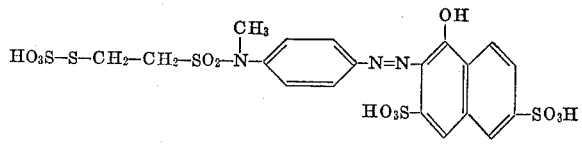

produces on cotton in the presence of sodium bicarbonate a strong scarlet dyeing of very good fastness to washing and light.

Example 7

50 parts of the dyestuff of the formula

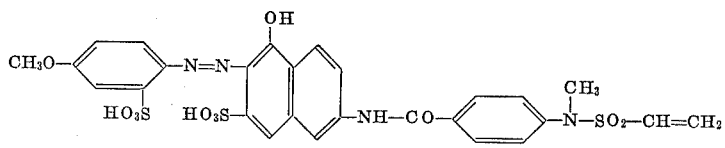

prepared by condensation of 2-amino-5-hydroxynaphthalene-7-sulfonic acid with 4 - (N - methyl - vinylsulfonylamino)-benzene-1-carboxylic acid chloride and by coupling of the condensation product thus obtained with diazotised 1-methoxy-4-aminobenzene-3-sulfonic acid, are introduced into 1000 parts by volume of water. Carbon dioxide is added to this mixture until the whole is saturated. 50 parts of crystallised sodium thiosulfate are added and carbon dioxide is introduced for another 22 hours while maintaining the temperature at 20° C. The dyestuff formed, which in its free acid form corresponds to the formula

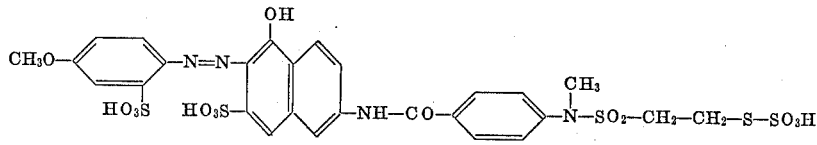

is salted out with sodium hydroxide solution of 10% (as referred to the volume of the solution), filtered and dried at 60° C. in vacuo.

The dyestuff produces in the presence of sodium hydroxide on cotton strong scarlet dyeings of fastness to washing and light.

Example 8

32.6 parts of 4-(N-methyl-β-thiosulfuric acid-ethylsulfonylamino)-1-aminobenzene are diazotised according to Example 2. The neutralised solution of the diazonium salt is then mixed with a solution of 34.8 parts of 1-hydroxy-naphthalene-4-sulfonic acid (64.9%) and 0.5 part of sodium carbonate in 200 ml. of water. After stirring for two hours the coupling mixture is neutralised with sodium carbonate and stirring is continued for 14 hours at 20° C. The dyestuff solution is filtered and mixed with potassium chloride. The precipitated dyestuff, which in its free acid form corresponds to the formula

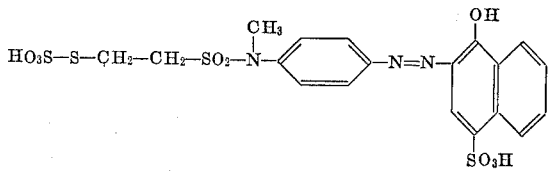

is filtered and dried. When fixing the dyestuff on cellulose textile material and simultaneously treating with an acid-binding agent, it forms deep and limpid scarlet dyeings of very good fastness to washing and light.

The following table lists the shades obtained on cellulose textile material by other azo dyestuffs that are mainly prepared as described in Example 8 by diazotising 4-(N-methyl-β-thiosulfuric acid - ethylsulfonylamino)-1-aminobenzene and coupling the diazo compound obtained with the coupling component given in the first column.

Coupling component:
(1) 1-hydroxy-naphthalene - 5 - sulfonic acid _____ Red.
(2) 1-hydroxy-naphthalene - 3 - sulfonic acid _____ Orange.
(3) -1hydroxy-naphthalene - 3.8 - disulfonic acid _____ Red.
(4) 1-hydroxy-naphthalene - 4.7 - disulfonic acid _____ Red.
(5) 1-(2′chloro-6′methyl - 4 - sulfophenyl)-3-methyl-5-pyrazolone ___ Yellow.
(6) 2-acetylamino-5-hydroxy - naphthalene-7-sulfonic acid _____ Orange.
(7) 1-phenyl - 3 - carboxy - pyrazolone _____ Golden yellow.
(8) 1-phenyl - 3 - carboxymethyl-5-pyrazolone _____ Reddish yellow.
(9) 8-phenylsulfonylamino - 1 - hydroxy - naphthalene-3.6-disulfonic acid _____ Red.
(10) 8 - acetylamino - 1 - hydroxy-naphthalene-4.6-disulfonic acid ___ Red.
(11) 8 - benzoylamino - 1 - hydroxy-naphthalene-3.6-disulfonic acid _____ Bluish red.

Example 9

7.3 parts of the salt-contaning 3-(N-methyl-β-thiosulfuric acid-ethylsulfonylamino)-1-aminobenzene obtained according to Example 5, first paragraph, are diazotised as described in this example. The solution of the diazonium salt obtained is neutralised with sodium bicarbonate and subsequently mixed with a solution of 5.1 parts of 1-(4′-sulfophenyl) - 3 - methyl-5-pyrazolone (98.8%) and 1.64 parts of sodium carbonate in 50 parts by volume of water. On completion of the coupling the dyestuff solution is filtered and mixed subsequently with potassium chloride of 20% (as referred to the volume of the solution). The dyestuff which has separated is filtered, washed with potassium chloride solution and dried. The azo dyestuff thus prepared, which in its free acid form corresponds to the formula

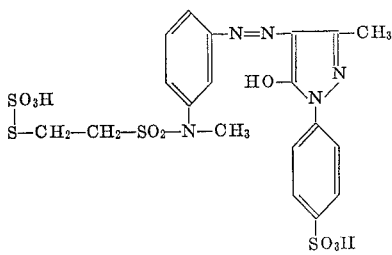

forms on cellulose textile material in the presence of acid-binding agents yellow dyeings of very good fastness to wetting and good to very good fastness to light.

The following table lists the shades obtained on cellulose textile material that other azo dyestuffs which are obtained mainly according to the method described in Example 9 by diazotisation of 3-(N-methyl-β-thiosulfuric acid-ethylsulfonylamino-1-aminobenzene and coupling of the diazo compound obtained with the coupling component given in the first column.

| Coupling component: | Shade |
|---|---|
| (1) 1-hydroxynaphthalene-5-sulfonic acid | Yellowish red. |
| (2) 1-(2'methyl-6'-chloro-4'-sulfophenyl)-3-methyl-5-pyrazolone | Yellow. |
| (3) 1-hydroxynaphthalene-3.6-disulfonic acid | Scarlet. |
| (4) 2-acetylamino-8-hydroxy-naphthalene-6-sulfonic acid | Scarlet. |
| (5) 2-acetylamino-5-hydroxy-naphthalene-7-sulfonic acid | Orange. |
| (6) 1-hydroxynaphthalene-4-sulfonic acid | Reddish orange. |
| (7) 8-acetylamino-1-hydroxy-naphthalene-4.6-disulfonic acid | Red. |
| (8) 1-hydroxynaphthalene-3-sulfonic acid | Orange. |

Example 10

54.5 parts of the condensation product of 8-amino-1-hydroxynaphthalene-3.6-disulfonic acid and 4-(N-methyl-vinylsulfonylamino)-benzene-1-carboxylic acid of the formula

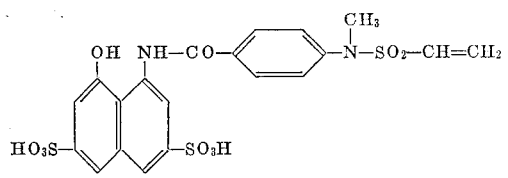

are dissolved in form of the sodium salt in 700 parts by volume of water at 70°–75° C. adjusted to pH 5.7–6.2 by means of dilute acetic acid. 85 parts of crystallised sodium thiosulfate are subsequently introduced and the mixture is stirred for 4 hours at 70°–75° C. The pH-value indicated above is maintained by adding slowly dropwise acetic acid of 50%. When the reaction has ceased the mixture is cooled to 20° C. and coupled in the usual manner with a solution of benzene diazonium chloride, which has been obtained by diazotising 9.3 parts of aniline. After coupling, precipitation of the monoazo dyestuff formed is completed by addition of sodium chloride and filtered. The new dyestuff of the formula

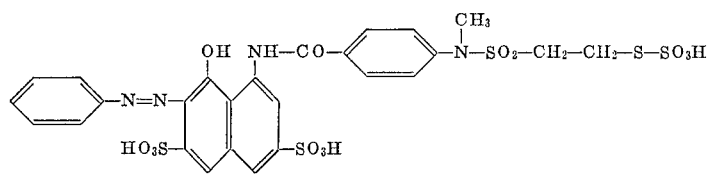

is then dried at 50° C. in vacuo and ground. It is a red water-soluble powder that produces on cellulose textile material when treated with an acid-binding agent bluish red dyeings of very good fastness to washing and of good fastness to light.

When using instead of 9.3 parts of aniline, 17.3 parts of 1-aminobenzene-2-sulfonic acid and operating as described above, a red dyestuff of similarly good fastness properties is obtained.

Example 11

53.0 parts of the dyestuff of the formula

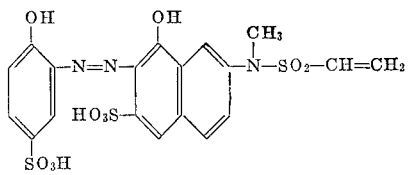

(prepared by coupling diazotised 2-aminophenol-4-sulfonic acid with 2 - (N-methyl-vinylsulfonylamino) - 8 - hydroxynaphthalene-6-sulfonic acid) are introduced in form of the sodium salt into 1000 parts by volume of water and heated to 70°–75° C. 95 parts of crystallised sodium thiosulfate are added at this temperature and the mixture is stirred for 4 to 5 hours at a pH-value of 5.6–6.2. The pH-value is maintained by adding continuously dilute acetic acid or formic acid. On completion of the reaction the product formed is isolated by salting out with sodium chloride. It is a brownish powder that dissolves in water producing a reddish orange color and in dilute sodium carbonate solution a violet color.

By the action of copper sulfate in an aqueous solution, a valuable copper complex dyestuff is obtained which forms on cotton in the presence of acid-binding agents ruby red dyeings of fastness to washing and light. The 2:1 chromium or 2:1 cobalt complex compound prepared correspondingly in the usual manner form on cotton strong violet and red brown prints of similarly good fastness properties.

Example 12

6.75 parts of the monoazo dyestuff of the formula

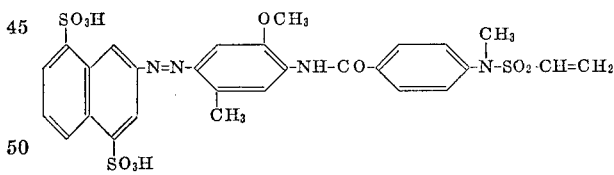

(obtained by coupling diazotised 2-aminonaphthalene-4.8-disulfonic acid with 3-amino-4-methoxytoluene and condensing the aminomonoazo dyestuff obtained with 4-(N-methyl - vinylsulfonylamino) - benzene - 1 - carboxylic acid chloride) are dissolved in form of the sodium salts in 250 parts by volume of water at temperatures within a range of 70°–75° C., and mixed with 6.75 parts of crystallised sodium thiosulfate. The pH-value of the mixture is maintained at 6.2–5.7 by adding slowly dropwise dilute acetic acid. The dyestuff solution is stirred for 4 hours at this pH-value and at the temperature indicated above, and cooled subsequently to 20° C. After precipitating with potassium chloride of 25% (as referred to the volume of the solution), filtering and washing with potassium chloride solution of 25%, the whole is dried at 50° C. in vacuo. A yellow powder is obtained that dissolves in water producing a reddish yellow color. The new dyestuff, which in its free acid corresponds to the formula

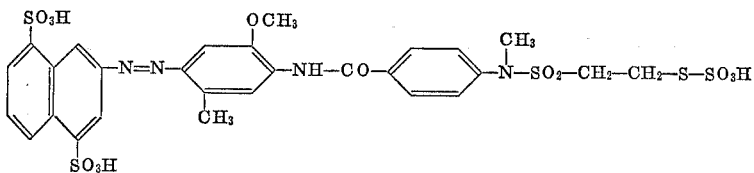

produces on cotton in the presence of acid-binding agents reddish yellow dyeings of very good fastness to light and of fastness to washing as well as to chlorine containing water.

Example 13

12.0 parts of 4 - (N-methyl-vinylsulfonylamino) - 2.5 - dimethyl-1-aminobenzene are suspended in 250 parts by volume of water and mixed with 12.5 parts of crystallised sodium thiosulfate. The mixture is then heated to 70°–75° C. and stirred at this temperature until the oil has almost completely disappeared. The pH-value of 5.7–6.2 is maintained by adding drop by drop 2 N acetic acid. After the reaction has ceased the solution is mixed with 1.5 parts of animal charcoal, filtered and cooled. After addition of 25 parts by volume of 5 N hydrochloric acid, the whole is diazotised as usual with 5 N sodium nitrite solution. The diazo suspension obtained is then combined with a solution of 17.4 parts of 1-hydroxynapththalene-4-sulfonic acid (64.9%) in 100 parts of volume of water and the pH-value is adjusted to 6.0–6.5 by interspersing sodium bicarbonate. On completion of the coupling reaction sodium chloride of 16% (as referred to the volume of the solution) is added and the precipitated dyestuff is filtered and dried.

The dyestuff obtained, which in its free acid from corresponds to the formula

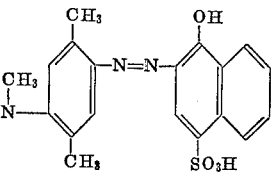

produces on regenerated cellulose fibers in the presence of soduim bicarbonate a strong scarlet dyeing of food fastness to light and washing.

The following table lists the shades obtained with other dyestuffs on cellulose textiles mainly according to the method described in the above examples by reacting azo dyestuffs that contain at least one group of the formula

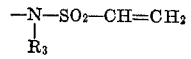

with salts of thiosulfuric acid or by coupling aromatic diazo, tetrazo or azodiazo compounds with coupling components at least one of the components carrying one group of the formula

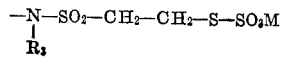

In the formulae of the table, Z stands for a β-thiosulfuric acid-ethylsulfonyl radical.

| Dyestuff | Shade |
|---|---|
| (1) ... [structure] | Scarlet. |
| (2) ... [structure] | Scarlet. |
| (3) ... [structure] | Red. |
| (4) ... [structure] | Yellow. |
| (5) ... [structure] | Red. |

| Dyestuff | Shade |
|---|---|
| (6) 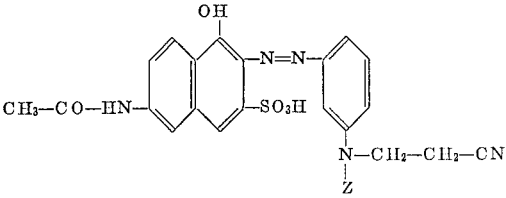 | Orange. |
| (7) 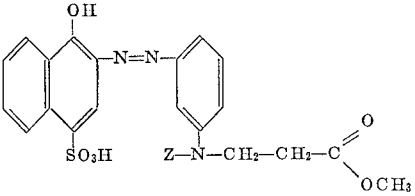 | Reddish orange. |
| (8) 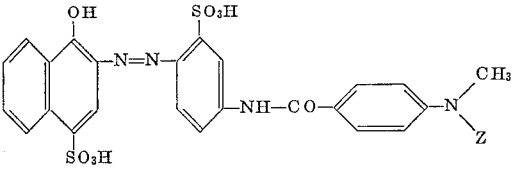 | Red. |
| (9) 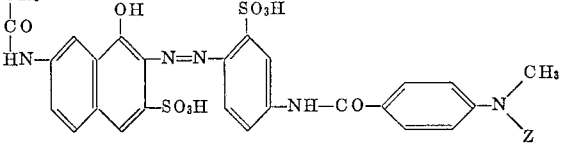 | Bluish red. |
| (10) 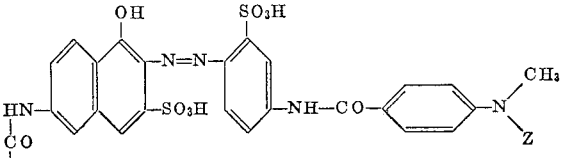 | Red. |
| (11) 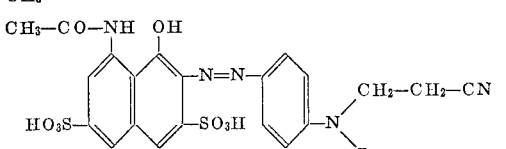 | Red. |
| (12) 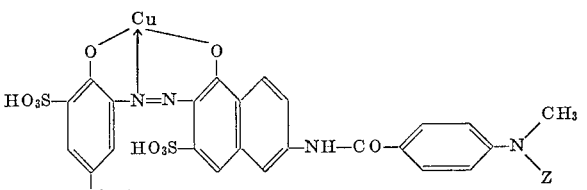 | Ruby. |
| (13) 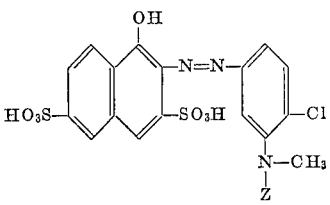 | Orange. |
| (14) 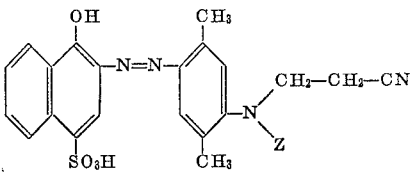 | Scarlet. |

| Dyestuff | Shade |
|---|---|
| (15) [naphthol-azo-dimethylamino-methoxyphenyl structure with OH, SO₃H, N(CH₃)Z, OCH₃] | Scarlet. |
| (16) H₃C—CO—NH, OH, HO₃S, SO₃H, —CO— bridge, N(CH₃)Z | Red. |
| (17) CH₃-CO-NH, OH, HO₃S, SO₃H, SO₂-NH-phenyl-N(CH₃)Z | Red. |
| (18) CH₃-CO-NH, OH, SO₃H, SO₃H, -O- bridge, N(CH₃)Z | Red. |
| (19) OH-naphthol, Z(CH₃)N—, SO₃H, azo to phenyl-N(CH₃)Z | Orange. |
| (20) H₃C-N(Z)-phenyl-CO-NH, OH, HO₃S, SO₃H, N(CH₃)Z | Bluish red. |
| (21) Cu complex azo, HO₃S, SO₃H, N(CH₃)Z | Ruby red. |
| (22) Cr complex bis-azo with O₃S, N(CH₃)-SO₂-CH₂-CH₂-S-SO₃, 5⁻ 5Na⁺ | Red brown. |

| | Dyestuff | Shade |
|---|---|---|
| (23) | 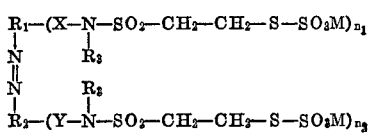 | Reddish blue. |
| (24) | | Orange. |
| (25) | | Bluish red. |
| (26) | | Black. |

2:1 chromium complex

We claim:
1. A water-soluble monoazo dyestuff of the formula

$$R_1-(X-N-SO_2-CH_2-CH_2-S-SO_3M)_{n_1}$$
$$|\ \ \ \ \ \ \ \ |$$
$$N\ \ \ \ R_3$$
$$||$$
$$N\ \ \ \ R_3$$
$$|\ \ \ \ \ \ \ \ |$$
$$R_2-(Y-N-SO_2-CH_2-CH_2-S-SO_3M)_{n_2}$$

wherein $R_1$ is a phenylene, monosulfophenylene, monosulfo-lower alkyl-phenylene, monosulfo-hydroxy-phenylene, di(lower-alkyl)-phenylene, lower alkoxy-phenylene, disulfo-hydroxy-phenylene, chlorophenylene, nitro-hydroxy-phenylene, carboxy-phenylene, monosulfonaphthylene or disulfonaphthylene group, the hydroxy and carboxyl groups being linked in o-position to the azo bridge; $R_2$ is a phenylene, lower alkylphenylene, lower alkoxyphenylene, di(lower alkyl)-phenylene, lower alkyl-lower alkoxy - phenylene, monosulfo - hydroxy-naphthylene, monosulfoacetylamino-hydroxy-naphthylene, disulfo-hydroxy-naphthylene, disulfo-acetylamino-hydroxy-naphthylene, disulfo - amino-hydroxy-naphthylene, disulfo-phenylsulfonyl-amino-hydroxy-naphthylene, disulfo-benzoyl-amino-hydroxy-naphthylene, 1-(4'-sulfo-phenyl)-3-methyl-pyrazolon-(5), 1-phenyl-3-carboxy-pyrazolon-(5), 1-phenyl-3-COO-lower alkyl-pyrazolon-(5), 1-(2'-chloro-4'-sulfo-6'-methyl)-3-methyl-pyrazolon-(5), or 1-(2'-chloro-5'-sulfo)-3-methyl-pyrazolon-(5) group, the hydroxy group being linked in o-position to the azo bridge; $R_3$ is a lower alkyl, lower alkylene-COO-lower alkyl or lower alkylene-cyano group; M is a hydrogen, sodium, potassium or calcium atom; X is a direct linkage or a

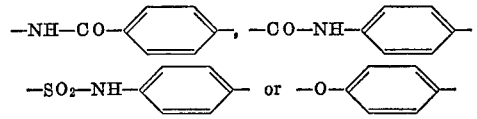

group attached to $R_1$ at a position other than ortho to the azo group; Y is a direct linkage or the

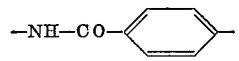

group attached to $R_2$ at a position other than ortho to the azo group; $n_1$ and $n_2$ each is 0 or 1, the sum of $n_1$ and $n_2$ being at least 1, or a complex copper, chromium or cobalt compound of said water-soluble monoazo-dyestuff, provided the molar proportion of said monoazo dyestuff to copper is 1:1, to cobalt is 1:1 or 2:1 and to chromium is 1:1 or 2:1, and provided further that in said complex dyestuff having said molar ratio 2:1 the two equivalents of said monoazo dyestuff are the same.
2. The water-soluble dyestuff of the formula

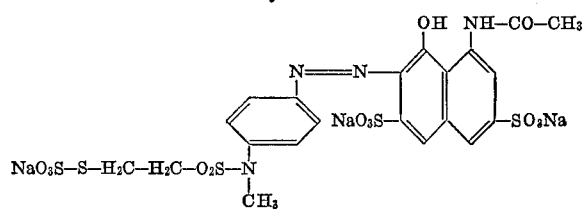

3. The water-soluble dyestuff of the formula

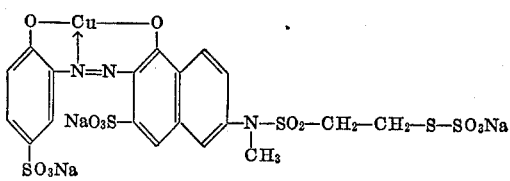

4. The water-soluble dyestuff of the formula

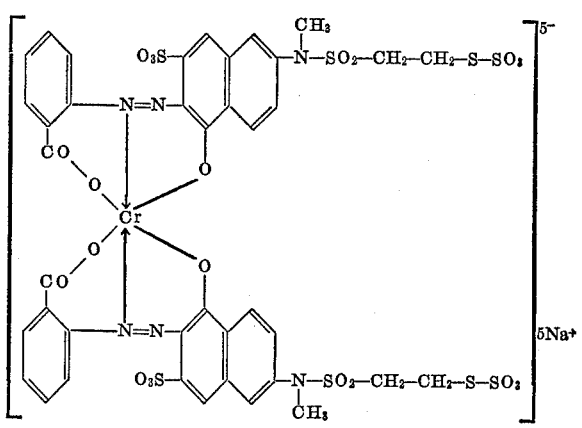

5. The water-soluble dyestuff of the formula

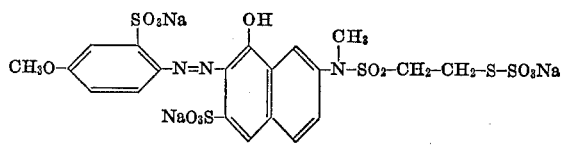

6. The water-soluble dyestuff of the formula

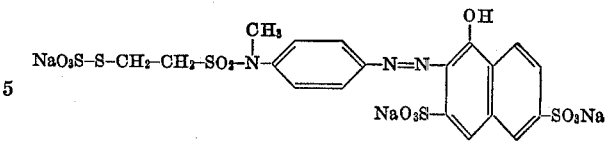

7. The water-soluble dyestuff of the formula

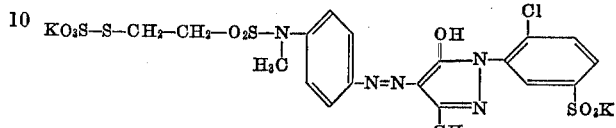

8. The water-soluble dyestuff of the formula

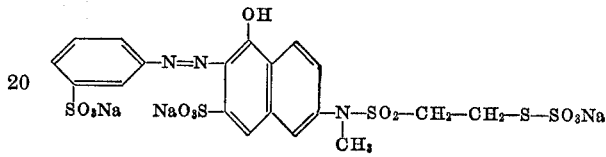

References Cited

UNITED STATES PATENTS

| | | | |
|---|---|---|---|
| 2,245,971 | 6/1941 | Felix et al. | 260—205 |
| 2,128,256 | 8/1938 | Krzikalla et al. | 260—200 |
| 3,097,908 | 7/1963 | Jellinek et al. | 260—163 X |
| 3,226,395 | 12/1965 | Schimmelschmidt et al. | 260—163 X |
| 3,297,678 | 1/1967 | Kühne et al. | 260—163 |
| 3,261,823 | 7/1966 | Kühne et al. | 260—149 |

CHARLES B. PARKER, *Primary Examiner.*

D. P. PAPUGA, *Assistant Examiner.*

U.S. Cl. X.R.

8—41, 55, 13, 51; 260—458, 556, 465, 310, 147, 150, 162, 163, 151, 197, 202, 205, 206, 198, 199, 37, 200, 196, 457